Feb. 23, 1954      L. R. TANSLEY      2,670,296
METHOD OF PRODUCING QUICK-FREEZING
AND QUICK-COOKING MEAT PATTIES
Filed April 9, 1951
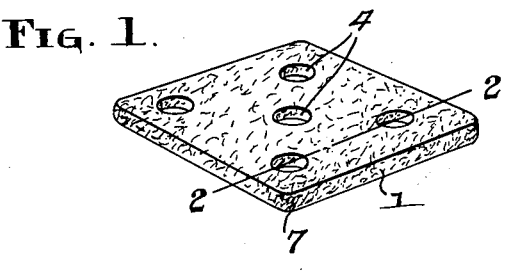
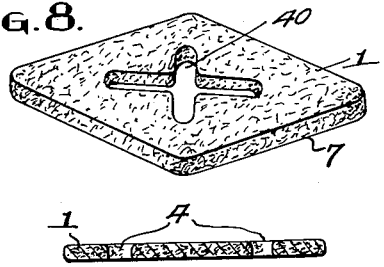
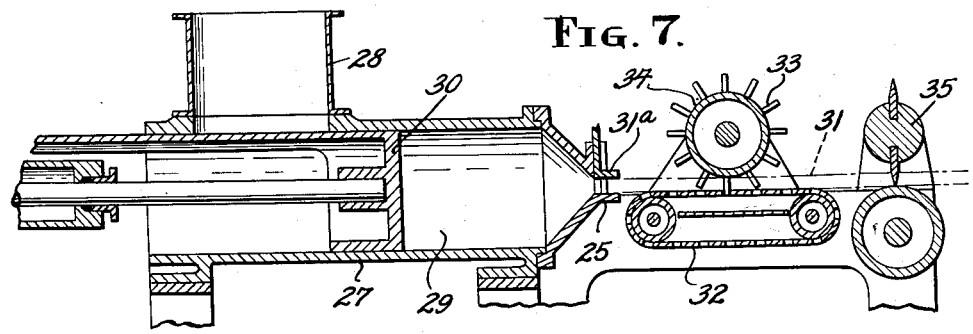
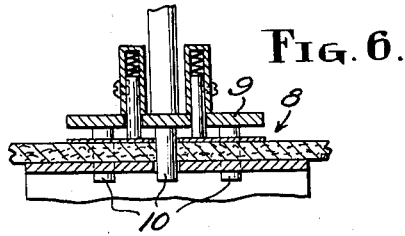
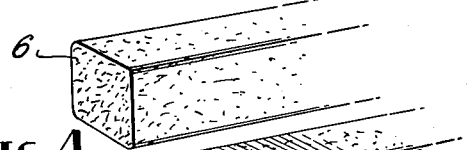
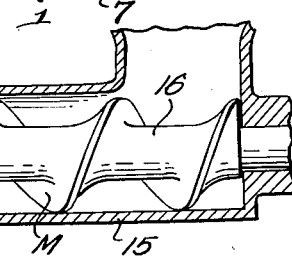
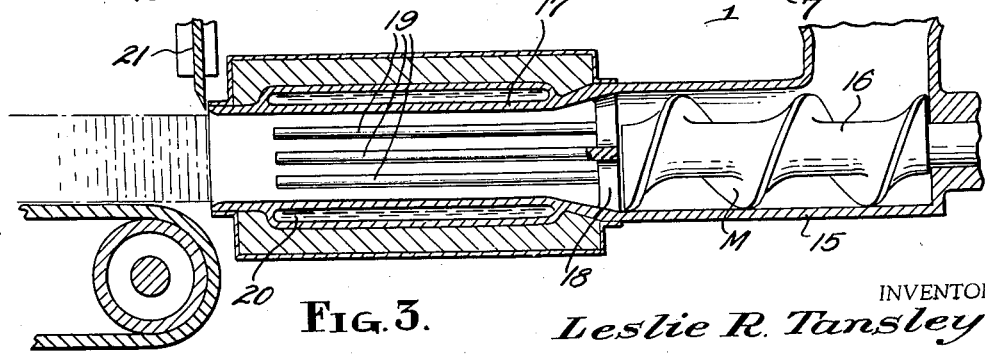
INVENTOR
*Leslie R. Tansley*
BY *W. S. McDowell*
ATTORNEY Patented Feb. 23, 1954

2,670,296

UNITED STATES PATENT OFFICE 2,670,296

METHOD OF PRODUCING QUICK-FREEZING AND QUICK-COOKING MEAT PATTIES

Leslie R. Tansley, Worthington, Ohio, assignor to White Castle System, Inc., Columbus, Ohio, a corporation of Delaware Application April 9, 1951, Serial No. 219,999

3 Claims. (Cl. 99—194)

This invention relates to food products and the preparation thereof, having particular reference to frozen food products and an improved method of and means for preparing such products to facilitate cooking and improve their nutritional values and taste when served.

In the prior co-pending application of Earl R. Howell, filed March 23, 1951, Serial No. 217,276, there is disclosed a comestible in the form of a frozen or refrigerated meat patty of perforate formation, and by which the same is adapted to rapid and uniform heating while undergoing cooking. The present invention is concerned primarily with the provision of an improved method and means by which such perforate food patties are produced.

My invention is further concerned with an improved method of and means for preparing ground meat of the kind used in hamburger sandwiches, whereby to effect its preservation and to facilitate cooking thereof.

In accordance with the present invention, following primary grinding or reduction of the meat, the same is compacted, extruded and refrigerated, preferably to sub-freezing temperatures, to form a relatively dense, solid, homogeneous body. This body is shaped or cut to form flat-sided strips or patties of uniform thickness and weight. The meat body, while firm and solid as a result of extrusion and refrigeration, is subjected to a perforating operation, which is so conducted as to provide spaced holes of desired diameter, arrangement and number in each of the patties. Thereafter, the patties or cakes are packed in containers in assembled side by side load or block-forming order, and subjected to low-temperature refrigeration. Such refrigeration is maintained until the individual patties or cakes are removed and separated from their respective blocks and placed in separate order on a heated platter for cooking purposes. The holes or perforations in the slices or cakes serve effectively during cooking to secure a quick and uniform distribution of the heat throughout the bodies of the meat cakes or patties, and thereby effect rapid, uniform and complete cooking thereof.

Among the objects of the invention are: to provide a method for forming a perforated meat cake or patty in which one or more perforations are produced in a manner to provide for rapid and uniform distribution of the applied cooking heat throughout all portions of the patty or cake body, whereby to shorten the time period necessary for complete cooking; to provide an improved method for preparing such meat patties or cakes in a rapidly performed manner and without adding to the cost of the product; to provide a method of extruding a comestible in the form of a molded and relatively compacted loaf-like body composed of ground meat, and wherein said body is formed with a plurality of relatively spaced parallel openings which extend from one end of the loaf body to its other; and to provide apparatus for forming a ground meat body of this character having perforate central regions which, when subjected to a cooking operation, shortens the normal cooking time by providing for improved heat distribution throughout the body.

For a more detailed understanding of my invention, including additional objects and advantages thereof, reference is to be had to the following description and the accompanying drawing wherein:

Fig. 1 is a perspective view disclosing a preferred form of my improved perforated meat patty;

Fig. 2 is a vertical sectional view taken transversely through the patty on the plane indicated by the line 2—2 of Fig. 1;

Fig. 3 is a vertical sectional view taken through a machine for extruding ground meats in blocks or loaf-forming order, and wherein the machine is equipped with means for producing spaced parallel and longitudinally extending openings in the extruded loaf;

Fig. 4 is a perspective view of a refrigerated meat loaf from which the sliced and perforated meat patties of the present invention are formed;

Fig. 5 is a similar view of the sliced and perforated loaf with the individual slices or patties arranged for packing in a container;

Fig. 6 is a vertical sectional view taken through punch-type patty-perforating mechanism utilized by the present invention;

Fig. 7 is a vertical sectional view taken longitudinally through an extruding mechanism employed by the present invention in producing flat meat cakes or patties from extruded meat strips;

Fig. 8 is a detail perspective view disclosing a meat patty formed with a modified type of perforation, involving centrally disposed intersecting slots.

The present invention provides a meat patty such as that shown at 1 in the accompanying drawing, the same being adapted for use as the meat constituent in hamburger sandwiches. The patty comprises a compacted ground meat body in the form of a cake, slice or wafer, having dimensions appropriate for reception between the top and bottom halves of a bread roll or bun.

In accordance with the present invention, the patty is provided with one or more transverse openings or perforations 4 which extend completely through the patty. These openings or perforations may be of suitable diameter and arrangement, and are disposed in such manner within the patty as to expedite the cooking of the central regions of the patty, especially when the latter is placed on a heated platter, whereby the central regions will be cooked simultaneously and uniformly with the outer marginal portions.

In producing the patty, selected meats at refrigerated temperatures of the order of 34 and 40 degrees Fahr. are ground to a desired degree and, immediately thereafter, are compacted to form a loaf or block 6 which possesses a stable homogeneous form. To preserve the natural taste characteristics of the meat, this block is subjected to low-temperature refrigeration, in which the temperature of the block is reduced rapidly to temperatures, for example, from 10 to 25 degrees below zero, Fahr.

After being so frozen and during maintenance of such low temperatures, the block is subjected to the action of an automatic slicing machine, or the like, not shown, to divide the same into a multiplicity of flat-sided patty-forming slices of appropriate thickness, the slices being indicated by the numeral 7. Temperatures of the order last specified are desirable in the slicing operation, in order that the meat loaf or block will be sufficiently solid to facilitate rapid and accurate cutting. Also, at these temperatures, the natural juices present in the meat are retained therein and exudation thereof prevented, since at these temperatures of slicing the juices are frozen and held within the loaf body.

While still in such solidly frozen form, the individual slices are placed on a perforating base, indicated at 8 in Fig. 6 of the drawings. This base coacts with a movable head 9, the latter being formed with perforating cutters 10, which, when moved with the head toward the base, pass through the slices 7, producing therein the openings or perforations 4. During the perforating operation, the slices are held against movement by being marginally confined, whereby to prevent cracking or shattering of the slices while at such low temperatures. However, I do not limit myself to any particular mechanism, as it will be understood that any suitable means may be used in effecting this perforating operation.

Following perforation, the slices are again placed in side by side block or loaf-forming order, and subjected to pressure to effect a degree of compaction on the part of the loaf or block so that the same may be wrapped or placed in a thin walled container, not shown, for handling and shipment. Immediately following such wrapping or packing, the product is restored to low temperature, which usually is not in excess of 20 degrees Fahr. Such low temperatures are employed to prevent thawing of the slices and thereafter insure the preservation of the product and cause the same to retain its freshness, natural juices and desired taste when cooked and served.

At the time of cooking, the block or loaf is removed from refrigeration, and as soon as possible thereafter, the individual slices or patties are removed and applied to a heated platter. At the time of such platter application, the meat cake or patty possesses a temperature usually below freezing, the same being characteristically hard, dense, solid and cold to the touch. When placed on the platter, due to the provision of the openings or perforations 4 therein, the meat slices or patties absorb heat quickly and uniformly over all body portions thereof, so that the frying or cooking operation may proceed with marked acceleration. It is unnecessary to turn the meat cakes over from one side to the other during the cooking operation, particularly when the openings or perforations 4 are provided therein, which is a further factor in hastening or reducing the cooking time normally allotted to such an operation.

In the apparatus disclosed in Fig. 3, a grinding and extruding mechanism is represented at M. The mechanism provides a casing 15, and a power driven auger 16 by which the ground meat is advanced through an extruding duct 17, the orifice at the outer end of this duct possessing the desired cross-sectional configuration which is to be imparted to the meat loaf or column extruded through said orifice. Arranged in the entrance portion of the duct 17 is a fixed spider 18 carrying, in this instance, a plurality of spaced parallel rods or mandrels 19. By the action of the auger 16, the ground meats are compacted around the rods or mandrels after passing through the openings formed in the spider 18, thereby producing in the extruded meat loaf the longitudinal openings indicated at 4. The meat loaf while undergoing compaction and shape formation in the duct 17 may be subjected to refrigeration by providing chambers 20 in the walls of said duct for the circulation of a fluid refrigerant. Adjacent to the outlet orifice of the duct, a cutter 21 is provided which upon being suitably operated severs the extruded materials into formed blocks or loaves of desired length. These blocks or loaves are then refrigerated to low temperatures and thereafter sliced in the customary manner. With the use of the apparatus shown in Fig 3, the cost of producing the improved meat patties of the present invention is maintained at a low figure.

In the form of the invention disclosed in Fig. 7, ground meat is introduced into a casing shown at 27 through an inlet 28. The casing 27 defines a chamber 29 in which is slidably positioned a ram or piston 30, the latter serving to advance ground meat forwardly of the chamber 29, causing its issuance in the form of a thin flat column, strip or ribbon, as indicated at 31, through an extruding orifice 31a provided in the member 25. Following discharge of the strip from the orifice 31a, the same is deposited on a traveling conveyor belt 32, and brought into engagement with radial punches 33, which project from the periphery of a revolving roll 34, the punches 33 serving to perforate the meat strip at regular intervals. Following the perforation, the strip may be severed to form the individual patties by the cutting mechanism, the cutting or severing mechanism being indicated by the numeral 35, the same being preferably of the rotary type, and times with the linear advance of the meat strip 31 to form patties of desired size.

In Fig. 8 of the drawings, a modified type of perforation has been disclosed at 40 which, instead of providing a plurality of spaced perforations, as shown in Fig. 1, comprises intersecting X-shaped slots which perform the same function. Obviously other opening or slot formations and arrangements may be resorted to within the scope of the present invention.

In view of the foregoing, it will be evident that the present invention provides improved methods and apparatus for producing frozen ground meat patties which are capable of being cooked with greater rapidity than the imperforate patties of the prior art. Also, by avoiding prolonged cooking, a patty is formed by the method and means herein defined characterized by its tenderness and improved taste over patties of customary formation and cooked in the usual manner. The apparatus lends itself readily to the production of such perforate patties, enabling the same to be produced at a cost approximating closely that of producing the ordinary frozen or refrigerated imperforate patty.

While I have particularly defined the present invention as being applicable to ground meat patties, it will be understood that the same may, also, be employed in the formation and cooking of other food products, such as soya bean patties, fish cakes, pork sausage or the like.

Since certain changes may be made in carrying out the above method and in producing my improved product without departing from the scope of the invention, it is intended that all matter contained in the above description shall be interpreted where the context admits as illustrative and not in a limiting sense.

I claim:

1. The method of producing quick-freezing and quick-cooking meat patties which comprises extruding ground meat under pressure to form a substantially homogeneous, compact column of meat; forming in the intermediate region of said column at least one opening which extends completely therethrough; and severing said column transversely to form a plurality of relatively thin flat-sided meat patties, each having an opening extending completely therethrough from side to side thereof.

2. The method of producing quick-freezing and quick-cooking meat patties which comprises extruding ground meat under pressure to form a substantially homogeneous, compact, cubical column of meat; simultaneously forming in said column of meat at least one opening extending longitudinally through said column; subjecting said meat to sub-freezing temperatures to quickly freeze the same; and severing said column transversely to form a plurality of relatively thin, flat-sided, frozen meat patties, each having an opening extending completely therethrough.

3. The method of producing quick-freezing and quick-cooking meat patties which comprises extruding ground meat under pressure to form a substantially homogeneous, compact, and relatively flat column of meat; freezing said column of meat; forming in said column of meat a plurality of openings extending completely therethrough; and severing said column transversely at longitudinal intervals to form a plurality of separate flat-sided meat patties, each having at least one opening extending completely therethrough from side to side thereof.

LESLIE R. TANSLEY.

References Cited in the file of this patent

UNITED STATES PATENTS

| Number | Name | Date |
|---|---|---|
| 1,943,019 | Henney et al. | Jan. 9, 1934 |
| 2,397,446 | Tansley | Mar. 26, 1946 |
| 2,521,849 | Hopkins et al. | Sept. 12, 1950 |